Oct. 24, 1950    E. G. McCAULEY    2,527,438
PROPELLER
Filed Oct. 19, 1944    2 Sheets-Sheet 1
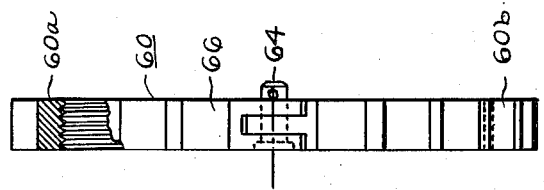
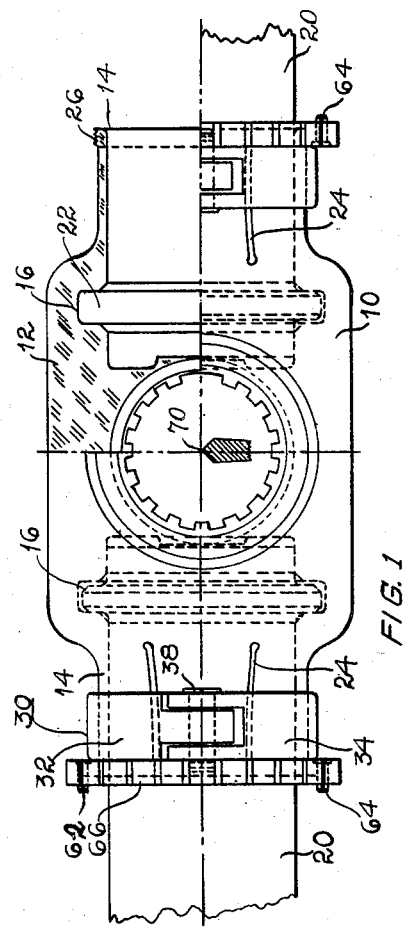
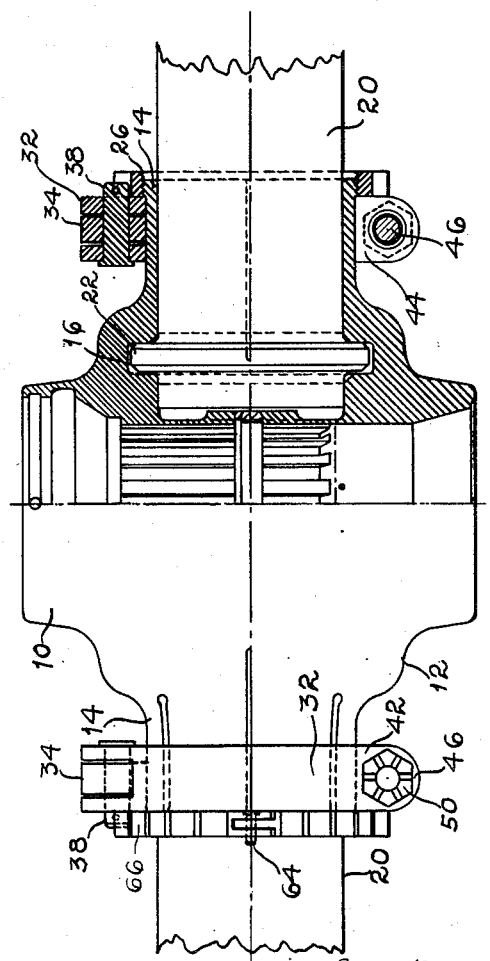

Oct. 24, 1950     E. G. McCAULEY     2,527,438
PROPELLER

Filed Oct. 19, 1944     2 Sheets-Sheet 2

Patented Oct. 24, 1950

2,527,438

UNITED STATES PATENT OFFICE 2,527,438

PROPELLER

Ernest G. McCauley, Dayton, Ohio

Application October 19, 1944, Serial No. 559,445

12 Claims. (Cl. 170—160.61)

This invention relates to a propeller assembly for aircraft and more particularly to the attachment of the propeller blade to the hub.

An object of this invention is to provide means for holding the shank of the propeller blade in proper relation with respect to the hub, which means is used in balancing the propeller assembly both radially or horizontally and axially or vertically, without the necessity of adding or removing metal from the propeller assembly and without changing the weight of the propeller assembly.

Another object of this invention is to provide a pair of cooperating members for clamping the shank of the blade to its support, one of said members being utilized for balancing the propeller horizontally and the other for balancing the propeller vertically, without altering the weight of the assembly, but merely redistributing the weight.

Another object of this invention is to provide cooperating members used in holding the shank of the blade in proper relation with respect to its support, wherein the members cooperate to lock each other in position, thereby preventing an unbalanced condition by the parts changing their position.

Other objects and advantages reside in the construction of parts, the combination thereof and the mode of operation, as will become more apparent from the following description.

In the drawings, Figure 1 is a fragmentary front elevational view of a support for the shanks of propeller blades, with parts shown in section.

Figure 2 is a top plan view of the assembly shown in Figure 1, with parts shown in section.

Figure 4 shows a threaded collar or ring used in balancing the propeller radially or horizontally and locking the shank in position with respect to its support.

Figure 3:
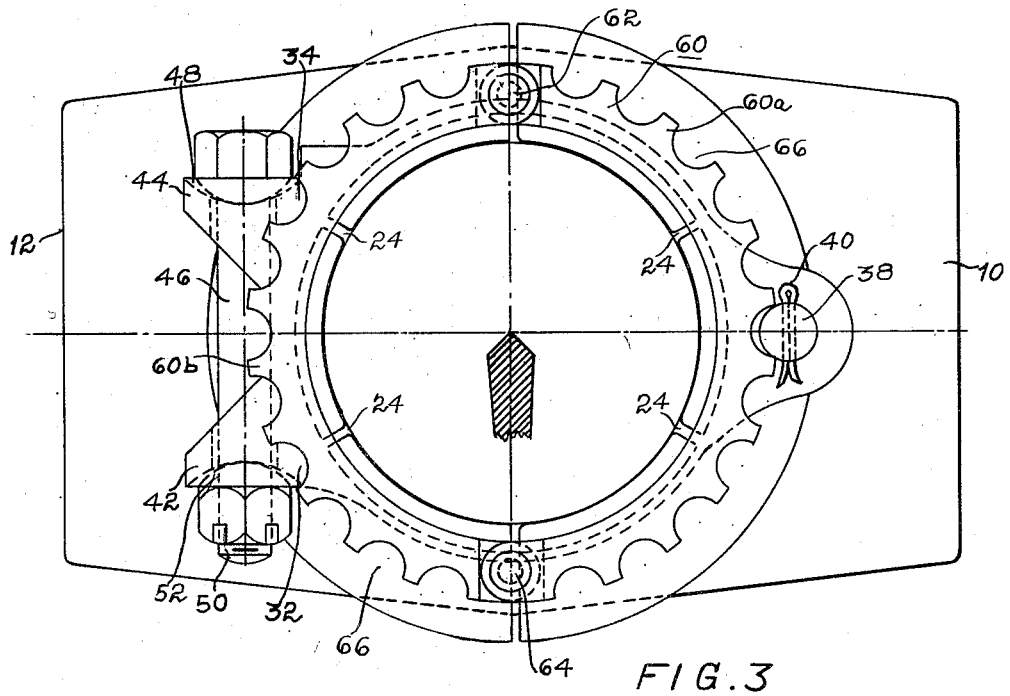
Figure 3 is an end elevational view of the support for the shank of a propeller blade shown in position for balancing.
Figures 5, 6:
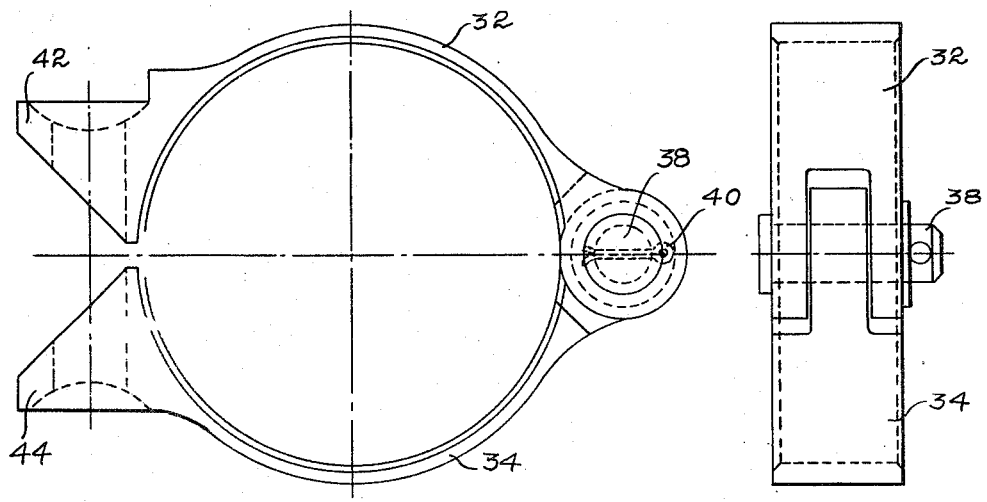
Figure 5 is an end elevational view of a split collar or ring used in clamping the shank of the blade to the sleeve or socket of the hub.
Figure 6 is another view of the split collar shown in Figure 5.

In the art of balancing propellers, various modes of balancing have been used. In the McCauley et al. Patent No. 1,608,755 and in the McCauley Patents No. 1,608,754 and No. 1,693,450, the horizontal balance of the propellers has been accomplished by changing the overall length of the propeller. Another mode of balancing propellers is to add a lead or some other metallic slug or slugs to one or the other of the propeller blades.

With the present day precision methods of manufacturing propeller blades, the blades are comparatively uniform and when assembled are nearly in balance, so that the degree of unbalance is quite small. Instead of shifting the propeller blade with respect to the hub, so as to shorten or lengthen the propeller, other parts of the propeller assembly may be shifted so as to attain the balanced condition. Furthermore, it is impractical to change the length of a propeller blade of propellers that are mounted for pitch adjustment.

In the embodiment shown herein, the propeller is balanced by actuating the mechanism used in clamping the shank of the propeller to the sleeve of the hub, as will appear more fully from the detailed description that follows.

Referring to the drawings, the reference character 10 indicates the front half of the hub and 12 the rear half of the hub. The two halves of the hub cooperate to form the sleeve 14 provided with an annular internal groove 16. The sleeve 14 receives a shank 20 that is provided with a collar 22 seated in the groove 16. The sleeve 14 has been provided with slots 24 that permit flexing of the portions between the slots 24 into contact with the shank of the blade. The outer end of the sleeve 14 is provided with an enlarged annular portion having external threads 26, which may be referred to as marginal threads. The shanks of the blades are engaged by the sleeve sectors that in turn are clamped together by a split collar or ring assembly 30 including the two halves 32 and 34, hinged together upon a suitable pin 38, held in position by a cotter pin 40. The ends of the two collar halves opposite the pin 38 are provided with ears 42 and 44, provided with apertures receiving a bolt 46 having a head forming a spherical segment 48. The nut 50 is provided with a spherical segmental portion 52 seated in arcuate recesses in the ears 42 and 44 respectively. The split collar or ring assembly 30, consisting of the halves 32 and 34, encircles the sleeve a short distance inside of the threaded portion 26 and abutting the inner side of the threaded portion.

A split collar or ring 60 consists of two halves 60a and 60b pivotally connected at 62 and held together by a retaining pin 64 diametrically disposed from the pivot 62. This ring is threaded upon the threaded portion 26 of the sleeve. The ring 60 is provided with a plurality of substantially equally spaced semi-cylindrical recesses 66, adapted to receive the outwardly projecting end of the pin 38. As may be clearly seen upon an inspection of Figures 1 and 2, the outer diameter of the collar 22 is greater than the internal diameter of the split collar or ring 30, consisting of members 32 and 34 and the internal diameter of the ring 60. In order to get the rings 30 and 60 on the shank of the blade and on the sleeve, it is necessary to remove the bolt 46 and the pin 64, so as to open up the rings while placing the rings in position. After the rings have been placed in position, the bolt 46 is inserted and tightened sufficiently to hold the ring 30 in frictional engagement with the sleeve. The pin 64 is inserted in the ring 60 in readiness to screw the ring 60 upon the marginal threads 26.

The sockets or sleeves 14, being provided with the longitudinal slots 24, consist of a plurality of segments that are clamped against the shank of the propeller blade. This slotted arrangement of the sockets or sleeves causes the socket or sleeve to be clamped against the shank uniformly throughout its periphery. When the sockets or sleeves are made from two solid halves, there is a tendency to clamp the shanks unequally, so as to cause the blade to be drawn askew. This has been eliminated by the use of split sleeves or sockets.

Mode of balancing

For the purpose of illustration, the balancing of a two-bladed propeller will be described. Due to the structure of propellers, nearly all propellers are balanced statically without any attempt at dynamic balancing. In the past, some propellers have been balanced by inserting one blade into the hub and balancing this blade with a dummy counterbalance mounted in a socket diametrically disposed from the blade mounted in position. After the first blade has been balanced, the second blade is substituted for the dummy and the propeller balanced with the two blades in position.

In the device disclosed herein, instead of adding to or subtracting from the weight of the propeller blades, the balancing is accomplished by shifting the rings 30 and 60, so as to thereby obtain a balanced assembly. Although in the manufacture of propeller blades the precision of manufacture is such that the blades when mounted in their respective sockets are practically in balance and only a slight adjustment is usually required, it is desirable to balance the propellers as accurately as possible, for the reason that due to the high velocity and the weight of the propellers, a very slight unbalance results in tremendous unbalanced forces being exerted when the propeller rotates at high speed, causing the propeller to become rough in operation.

The propeller is first balanced by placing the two propeller blades horizontally on a pivot shown schematically at 70 in Figure 1. In actual practice the hub is placed upon a support that is mounted for rotation, so that a slight unbalanced condition results in the propeller assembly rotating on its axis of rotation. The pin 38 is first moved inwardly, so as to become flush with the outer portion of the ring 32 in Figure 2, so that the collar 60 on the heavy side of the propeller may be rotated on the threads 26, so as to advance the collar 60 inwardly, together with the ring 30, towards the center of the hub, thereby moving the ring 30 and the collar 60 to correct the unbalanced condition. Thus a very accurate static balance of the blades in horizontal position is made easily.

After the blades have been balanced when resting in a horizontal position, the propeller is rotated through 90°, so as to be positioned in a vertical position, as shown schematically at 71 in Figure 1. In this position the blades are tested for vertical balance. If the blades have a tendency to rotate either in a clockwise or a counterclockwise direction, the rings 30 are rotated around the sleeve 14, so as to shift the weight of the enlarged or heavy parts 42 and 44 of the ring, to thereby add weight to the light side of the propeller. Both the rings 30, that is, the one used on one side of the hub and the other on the opposite side of the hub, are rotated equal distances in the same direction, so as to obtain a symmetrical distribution of weight.

Whenever the propeller has been balanced in a vertical direction, the collars 60 on each side of the hub are rotated sufficiently so as to bring the first notches 66 in registry with the pins 38, unless there is already a notch in registry. The slight angle through which the collars 60 are rotated in order to cause registry between the notches and the pins is insufficient to unbalance the propeller blade assembly both horizontally and vertically. After the ends of the pins 38 have been seated in the notches 66, so as to prevent rotation of the collars 30, cotter pins 40 are inserted through the pins. The positioning of the pins 38 in the notches 66 counterbalance each other, so as to prevent an unbalanced condition. Furthermore, the weight of the two cotter pins counterbalance each other to prevent the cotter pins from unbalancing the propeller assembly.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A propeller assembly including a hub having outer threaded portions, a plurality of radially disposed propeller blades attached to the hub, a plurality of balancing means for balancing the propeller assembly horizontally without adjusting the propeller blades, there being one means for each propeller blade, a plurality of balancing means for balancing the propeller assembly vertically without adjusting the propeller blades with respect to the hub, there being one of the second mentioned means for each propeller blade, one of said means being provided with threads engaging the threaded portions of the hub so as to hold the threaded means in fixed relation with respect to the hub, the other of said means engaging the hub, a plurality of bolts one for each of the blades for clamping one of the means to the hub, and a plurality of members one for each blade attached to one of the means and positively engaging the other means, said members interlocking the two aforementioned means so as to hold said two means in fixed relation with respect to each other.

2. A propeller assembly including a hub having threaded portions, a plurality of radially disposed blades fixedly attached to said portions of the hub, threaded balancing means engaging the threaded portions of the hub, slidable balancing means mounted adjacent the threaded means for balancing the propeller assembly, said slidable means clamping the blades in position, said slidable means being provided with enlarged portions adapted for movement around the shanks of the blades to balance the blades vertically, means for clamping the slidable means in a fixed position upon the hub, and a member carried by one of said balancing means and positively engaging the other of said balancing means for interlocking the threaded means and the slidable means so as to hold the threaded means and the slidable means in a fixed position with respect to the propeller assembly.

3. A propeller assembly including a hub having a plurality of radially disposed threaded portions, a plurality of radially disposed propeller blades fixedly attached to said portions of the hub, a plurality of threaded balancing rings one for each of the propeller blades, said rings threadedly engaging the threaded portions of the hub, slidable balancing rings mounted adjacent the threaded portions for balancing the propeller assembly, there being one slidable ring for each of the blades for clamping the blades and the radially disposed portions in fixed relation with respect to each other, each of said slidable rings being provided with an enlarged portion adapted for movement around the shank of its blade to balance the blade vertically, means for clamping one of the slidable rings to the hub, a plurality of members one for each blade for interlocking the threaded and slidable rings associated with each blade so as to hold said two rings in fixed angular relation with respect to each other.

4. A propeller assembly including a hub having a plurality of radially disposed threaded portions, a plurality of radially disposed propeller blades fixedly attached to said portions of the hub, a plurality of threaded rings one for each of the propeller blades, said rings threadedly engaging the threaded portions of the hub for balancing the blades horizontally, each of said rings being provided with a plurality of recesses circumferentially disposed with respect to the axis of the ring, a set of slidably mounted clamping rings one for each of the blades for clamping the blades and the radially disposed portions in fixed relation with respect to each other, said clamping rings being mounted upon radially disposed portions of the hub adjacent the threaded portions thereof, each of said clamping rings being provided with an enlarged portion adapted for movement around the shank of its blade to balance the blade vertically, and means carried by each clamping ring adapted to project into a selected recess in the adjacent threaded ring so as to interlock the two rings to hold the two rings in fixed spaced relation with respect to each other.

5. A propeller assembly including a hub having a plurality of radially disposed threaded sleeves, a plurality of radially disposed propeller blades there being one blade for each of the sleeves, a plurality of threaded rings one for each of the sleeves, said rings threadedly engaging the sleeves for balancing the propeller assembly horizontally, a plurality of clamping rings mounted upon the sleeves between the threaded rings and the axis of rotation of the hub, said clamping rings abutting the adjacent threaded ring, said clamping rings having enlarged portions used in balancing the propeller assembly vertically, and means for interlocking each clamping ring to its adjacent threaded ring so as to hold the rings in fixed spaced relation with respect to each other.

6. A propeller assembly including a hub having a plurality of radially disposed threaded sleeves, a plurality of radially disposed propeller blades there being one blade for each of the sleeves, a set of threaded rings one for each of the sleeves, said rings threadedly engaging the sleeves for balancing the propeller assembly horizontally, a set of clamping rings mounted upon the sleeves between the threaded rings and the axis of rotation of the hub, said clamping rings abutting the adjacent threaded ring, said clamping rings having enlarged portions used in balancing the propeller assembly vertically, each ring of one of said sets of rings being provided with a plurality of circumferentially disposed recesses, and locking means associated with each ring of the other set of rings, said locking means being seated in said recesses to hold the clamping rings in fixed relation with respect to the adjacent threaded rings.

7. A propeller assembly including a hub having a plurality of radially disposed threaded sleeves, a plurality of radially disposed propeller blades there being one blade for each of the sleeves, a set of threaded rings one for each of the sleeves, said rings threadedly engaging the sleeves for balancing the propeller assembly horizontally, a set of clamping rings mounted upon the sleeves between the threaded rings and the axis of rotation of the hub, said clamping rings abutting the adjacent threaded ring, said clamping rings having enlarged portions used in balancing the propeller assembly vertically, a plurality of pins one fixedly attached to each ring of one set, the rings of the other set being provided with circumferentially disposed recesses, said pins projecting into selected recesses in the rings of the other set for interlocking the rings so as to hold the rings in fixed spaced relation upon the sleeves.

8. A propeller assembly including a hub having a plurality of radially disposed threaded sleeves, a plurality of radially disposed propeller blades, there being one blade for each of the sleeves, a plurality of split threaded rings one for each of the sleeves, means for closing said split rings, said rings threadedly engaging the sleeves for balancing the propeller assembly horizontally, a plurality of split clamping rings mounted upon the sleeves between the threaded rings and the axis of rotation of the hub, means for clamping said rings adjacent the threaded rings, said clamping rings having enlarged portions used for balancing the propeller assembly vertically, and means for interlocking each clamping ring to its adjacent threaded ring so as to hold the rings in fixed spaced relation with respect to each other.

9. A propeller assembly including a hub having a plurality of radially disposed threaded sleeves, a plurality of radially disposed propeller blades, there being one blade for each of the sleeves, a set of split threaded rings one for each of the sleeves, means for closing said split rings, said rings threadedly engaging the sleeves for balancing the propeller assembly horizontally, a set of split clamping rings mounted upon the sleeves between the threaded rings and the axis of rotation of the hub, means for clamping said rings adjacent the threaded rings said clamping rings having enlarged portions used for balancing the propeller assembly vertically, one set of rings being provided with recesses, the other set of rings being provided with pins projecting into selected recesses of the first set so as to hold the rings in a non-rotative position with respect to each other to thereby lock the rings in position.

10. A propeller including a plurality of blades, a hub including a plurality of radially disposed sleeves, the outer margin of each sleeve being enlarged and provided with external threads, a set of slidably mounted split collars there being one split collar for each sleeve mounted in the vicinity of the enlarged margin, a set of split collars having internal threads threadedly engaging the marginal threads on the sleeves, the threaded split collars being utilized in holding the first split collars in a position to balance the blades horizontally, said first split collars being provided with enlarged portions which balance the blades vertically, one set of collars being notched peripherally, the other set of collars including means seated in said notches to interlock the collars.

11. A propeller assembly including a hub, a plurality of propeller blades, said hub including radially disposed split sleeves, each having the outer margin enlarged and provided with external threads, a plurality of pivotally interconnected split collars, there being one split collar to each split sleeve mounted in the vicinity of the enlarged margin and directly contacting the sleeve, said split collars consisting of two halves, a pin for pivotally interconnecting the two halves, said pin extending beyond the collar, and a plurality of split collars having internal threads threadedly engaging the marginal threads of the split sleeves, said threaded split collars being provided with peripheral serrations, the threaded split collars being utilized in holding the first split collars in a position to balance the blades horizontally, the pin in the first split collar projecting into a selected serration of the second split collar to interlock the collars so as to prevent relative rotation thereof.

12. A propeller assembly including a hub, said hub including radially disposed split sleeves, each having the outer margin enlarged and provided with external threads, a plurality of propeller blades seated in said sleeves, a plurality of split collars having internal threads threadedly engaging the marginal threads of the split sleeves, said threaded split collars being provided with peripheral serrations, a plurality of pivotally interconnected split collars, there being one split collar to each split sleeve, said pivotally interconnected collars being mounted in the vicinity of the enlarged margin and directly contacting the sleeves, said pivotally interconnecting split collars consisting of two halves, and a pin for pivotally interconnecting the two halves, said pin extending beyond the collar, said pivotally interconnected split collars being located between the threaded collars and the axis of rotation of the hub, the threaded split collars being utilized in holding the pivotally interconnected collars in a position to balance the blades horizontally, the pin in the first split collar projecting into a selected serration of the second split collar to interlock the collars so as to prevent relative rotation thereof.

ERNEST G. McCAULEY.

REFERENCES CITED

The following references are of record in the file of this patent:

UNITED STATES PATENTS

| Number | Name | Date |
| --- | --- | --- |
| 1,728,315 | Vial | Sept. 17, 1929 |
| 1,831,949 | Euchenhoffer | Nov. 17, 1931 |
| 1,995,312 | Larason | Mar. 26, 1935 |
| 2,016,000 | Freeland | Oct. 1, 1935 |

FOREIGN PATENTS

| Number | Country | Date |
| --- | --- | --- |
| 784,068 | France | July 22, 1935 |